March 12, 1963 K. STEINBUCH ETAL 3,081,406

CRYOGENIC BISTABLE DEVICE

Filed Sept. 14, 1959 3 Sheets-Sheet 1

INVENTOR.
K. STEINBUCH-
H. REINER

BY Paul Hemminger

AGENT

INVENTOR.
K.STEINBUCH-
H.REINER
BY
Paul W. Hemminger
AGENT

March 12, 1963 K. STEINBUCH ETAL 3,081,406

CRYOGENIC BISTABLE DEVICE

Filed Sept. 14, 1959 3 Sheets-Sheet 3

INVENTOR.
K. STEINBUCH-
H. REINER

BY Paulen Henninger

AGENT

United States Patent Office 3,081,406

Patented Mar. 12, 1963

3,081,406

CRYOGENIC BISTABLE DEVICE

Karl Steinbuch, Reichenbach, near Karlsruhe, and Hans Reiner, Leonberg, Wurttemberg, Germany, assignors to International Standard Electric Corporation, New York, N.Y., a corporation of Delaware Filed Sept. 14, 1959, Ser. No. 839,742
Claims priority, application Germany Sept. 13, 1958
5 Claims. (Cl. 307—88.5)

This invention relates in general to cryogenic bistable devices and in particular to such devices utilizing superconducting cores and windings. Its principal object is to provide an improved device of the above character in which the switching elements and control elements are separated.

Superconducting components, termed cryotrons, are known, which, in their simplest form, utilize a length of wire surrounded by a single-layer control winding. When the temperature of the material commonly used in cryotrons is brought within the range of 0° K. to 17° K., these materials suddenly lose their normal resistance and assume a zero resistance and become superconductive. When the superconducting material is subjected to a magnetic field without a change in temperature, the material loses its superconductivity and assumes its normal resistance again. The cryotron can thus be used as a switching element, by rapidly changing from a normal resistance condition to a zero resistance condition.

Bistable trigger devices utilizing several interconnected cryotrons are known, several types being described in an article by Mr. D. A. Buck entitled "The Cryotron, a Superconductive Computer Component" and published in pages 482 to 493 of the April 1956 issue of the Proceedings of the IRE. It will be noted, however, that the bistable trigger devices shown in the noted article utilize the same elements for switching purposes and control purposes and are thus unsuitable for many applications wherein the control and switching functions must be separate. One application, wherein the described bistable trigger device is unsuitable, is utilizing it as a switching crosspoint in a telecommunication system.

According to the present invention, a bistable device of superconductive material is provided wherein the elements performing the control functions are separate from the controlled elements. Further, a bistable device is provided which contains a plurality of switching branches which are arranged in a T-shape or $\pi$-shape configuration, which device finds ideal application in telecommunication systems, for example. The present invention is also concerned with providing a link-access switching system utilizing the inventive multi-branch bistable trigger device.

Other objects and features of the invention will become apparent and the invention will be best understood when the specification is read in conjunction with the accompanying drawings comprising FIGS. 1 to 8 wherein.

Figure 1:
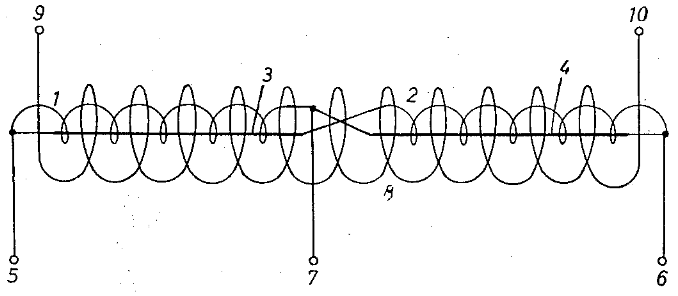
(PRIOR ART) Fig. 1
FIG. 1 shows a bistable trigger device of the prior art.

It has been chosen to illustrate a cryogenic device as a circle containing a resistive element with an arrowhead swingable from one end of the resistor to the other. When the cryogenic device is in a normal conductivity condition, the resistance is included in series with the input and output conductors of the device. When the cryogenic device is in a superconductivity condition, the resistance is shunted and a non-resistive connection exists between the input and output conductors. In the drawings, the dotted lines enclosing the groups of cryogenic devices signify one complete bistable device.

Referring now to FIG. 1 of the drawings, a brief description of the prior-art device shown therein will be given.

The trigger device of FIG. 1 comprises two coils 1 and 2 surrounding straight wire conductors 3 and 4 respectively. The entire device is surrounded by a coil 8. One end of each of the coils 2 and 3 is connected to the same end of its encircled straight wire core while the other end of each coil is connected to the free end of the core of the other coil. Control conductors 5, 6, and 7 are connected to the ends and center of the device while control conductors 9 and 10 are connected to the ends of coil 8.

Assuming coils 1 and 2 consist of niobium (Nb, commonly termed columbium) and cores 3 and 4 consist of tantalum (Ta) and assuming that the entire device is brought to a temperature of 4.2° K., for example, then the coils and cores exhibit superconductivity.

When a predetermined current flows between conductors 5 and 6, the device will assume one of two stable conditions corresponding to the superconductivity of one or the other of cores 3 and 4. Assuming the current passes through superconducting core 3 and coil 2, the magnetic field created by coil 2 will destroy the superconductivity of core 4. The normal resistance of core 4 will prevent a sufficient magnetic field from being created in coil 1 and thus core 3 will remain superconductive. In the other stable state, core 4 is superconductive while core 3 is not.

Assuming core 3 to be superconductive and core 4 to be of normal conductivity, the application of a pulse of current of a predetermined direction between conductors 9 and 10 will create a magnetic field which will oppose the field of coil 2 and permit core 4 to be superconductive. At the same time, the generated magnetic field of coil 8 destroys the superconductivity of core 3. At this time, the device assumes its other stable state. A subsequent application of current of an opposite polarity to coil 8 will again shift the device to its original stable state.

Figure 2:
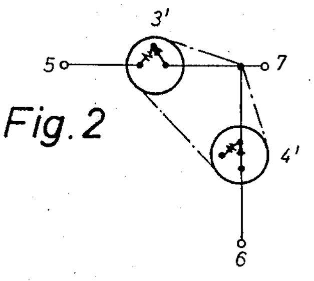
FIG. 2 shows an equivalent circuit diagram of the device of FIG. 1.

The shifting of the device from one state to the other may be used to produce potential variations between conductors 5, 6, and 7. An equivalent switch circuit is shown in FIG. 2 wherein conductor 5 can be switched into circuit with conductor 7 to the exclusion of conductor 6 or conductor 7 can be switched into circuit with conductor 6 to the exclusion of conductor 5.

Figure 3:
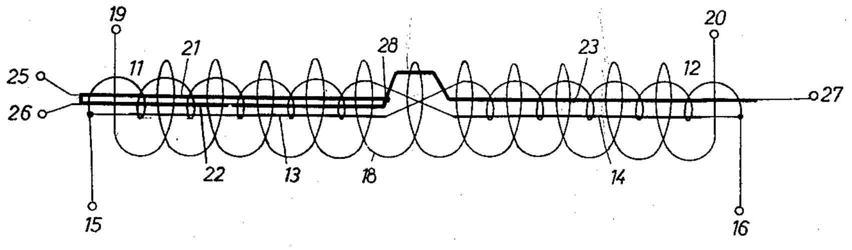
FIG. 3 shows a multi-branch bistable trigger device of the present invention arranged according to a T-shaped configuration.

Referring to FIG. 3 there is shown a trigger device consisting of two coils 11 and 12 inside which the wire-shaped conductors 13, 14, 21, 22, and 23 are arranged. The whole arrangement is surrounded by the coil 18. The coils 11 and 12 are connected to the conductors 13 and 14 in the same way as shown in the arrangement according to FIG. 1. The wire-shaped conductors 21, 22, and 23 are connected to each other at point 28, so that an arrangement is obtained whose branches 21 and 22 extend inside the coil 11, and whose branch 23 extends inside the coil 12. The free ends of the three branches are connected to the lead-in conductors 25, 26, and 27.

Figure 4:
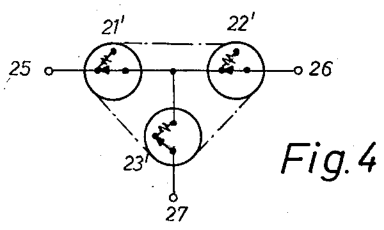
FIG. 4 shows an equivalent circuit diagram of the device of FIG. 3.

The mode of operation of the arrangement of FIG. 3 per se corresponds per se to that of the already known arrangement described with reference to FIG. 1. The parts 11, 12, 13, and 14 serving as the control, however, are electrically separated from the controlled parts which effect the actual switching operations. In the one triggered condition, due to the magnetic field produced by coil 11, the superconductivity of the two branches 21 and 22, for example, of tantalum, is eliminated, while branch 23, for example, of niobium, retains its superconductivity. In the other triggered state the conditions are vice versa with branches 21 and 22 being superconductive while branch 23 is of normal conductivity. A corresponding equivalent circuit diagram is shown in FIG. 4, in which either the contacts 21' and 22' are closed and the contact 23' is opened, or vice versa. Such an arrangement can be used, for example, for achieving in the one condition a current flow from 25 to 26, simultaneously suppressing a flow towards 27; the other condition then corresponds to no current flowing between 25 and 26, while simultaneously the centre point between the switches 21' and 22' is connected through towards 27, so that for example this point can be applied to ground potential via 23 and 27.

Figure 5:
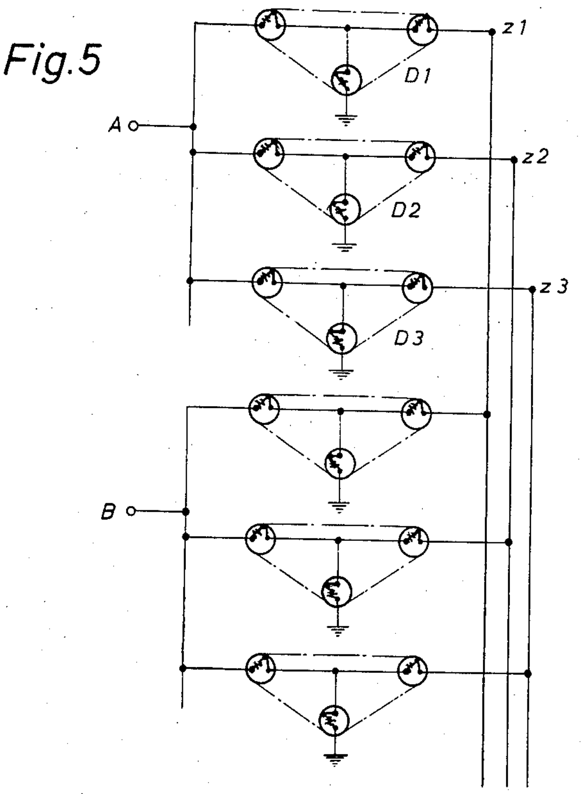
FIG. 5 shows a simplified network of a link-access switching system utilizing the device of FIG. 3.

FIG. 5 shows a single-wire link-access switching system employing trigger devices according to FIG. 3. Each of the subscribers, for example, the subscribers A and B, are multiple connected in a single-wire fashion via a number of trigger devices D1 . . . to the further wires Z1 . . . . The connecting-through of the wires is effected via the two serially arranged switching wires (21 and 22, FIG. 3) constituting the two longitudinal members of the arrangement. The switching wire (23, FIG. 3) constituting the shunt member, is led to ground. When a call is made, for example, by the subscriber A then, by the action of common control apparatus (not shown) current is supplied to the control elements of the trigger device D1. Device D1 which hitherto assumed the trigger condition corresponding to a blocking of the wire, is brought into the other condition, so that the subscriber A will be connected through in this way to the multiple conductor Z1. By busy-test control equipment (not shown), the corresponding trigger devices which are assigned to the remaining subscribers of the respective group, are prevented from being connected through to the same multiple conductor (Z1) at the same time. Accordingly, the arrangement has a similar effect as a preselector.

Figures 6, 7:
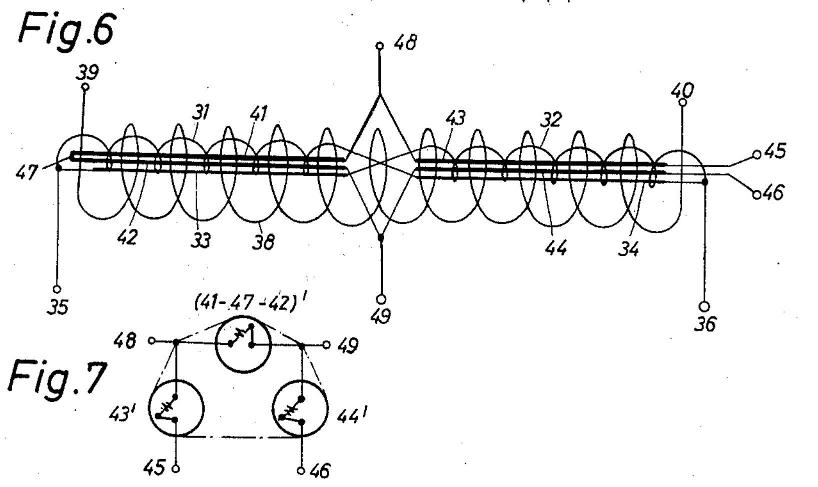
FIG. 6 shows a multi-branch bistable trigger device of the present invention arranged according to a $\pi$-shaped configuration.
FIG. 7 shows an equivalent circuit diagram of the device of FIG. 6.

In FIG. 6 the coils 31 and 32, as well as the conductors 33 and 34 arranged in the core of the coil, correspond to the coils 11 and 12, and to the conductors 13 and 14 of FIG. 3 respectively, thus representing the control system of the trigger device. For effecting the trigger processes there is provided a coil 38 surrounding the entire arrangement. Besides the conductors 33 and 34 the further wire-shaped conductors 41, 42, 43 and 44 are provided in the inside of the control coils. These conductors are connected together in such a way that a $\pi$-shaped circuit element is produced. For this purpose the wires 41 and 43 are connected together at one end, and are led in common to the output 48. In the same way the wires 42 and 44 are connected together at one end, and are led to the output 49. The wires 41 and 42 provided in the inside of the coil 31, are connected together at their other end, at the point 47, while the conductors 43 and 44, which are provided in the inside of the other control coil, are connected to the two lead-out conductors 45 and 46. The mode of operation of this arrangement will be easily understood from the above explanations and with reference to the equivalent circuit diagram of FIG. 7, so that a further explanation is unnecessary.

Figure 8:
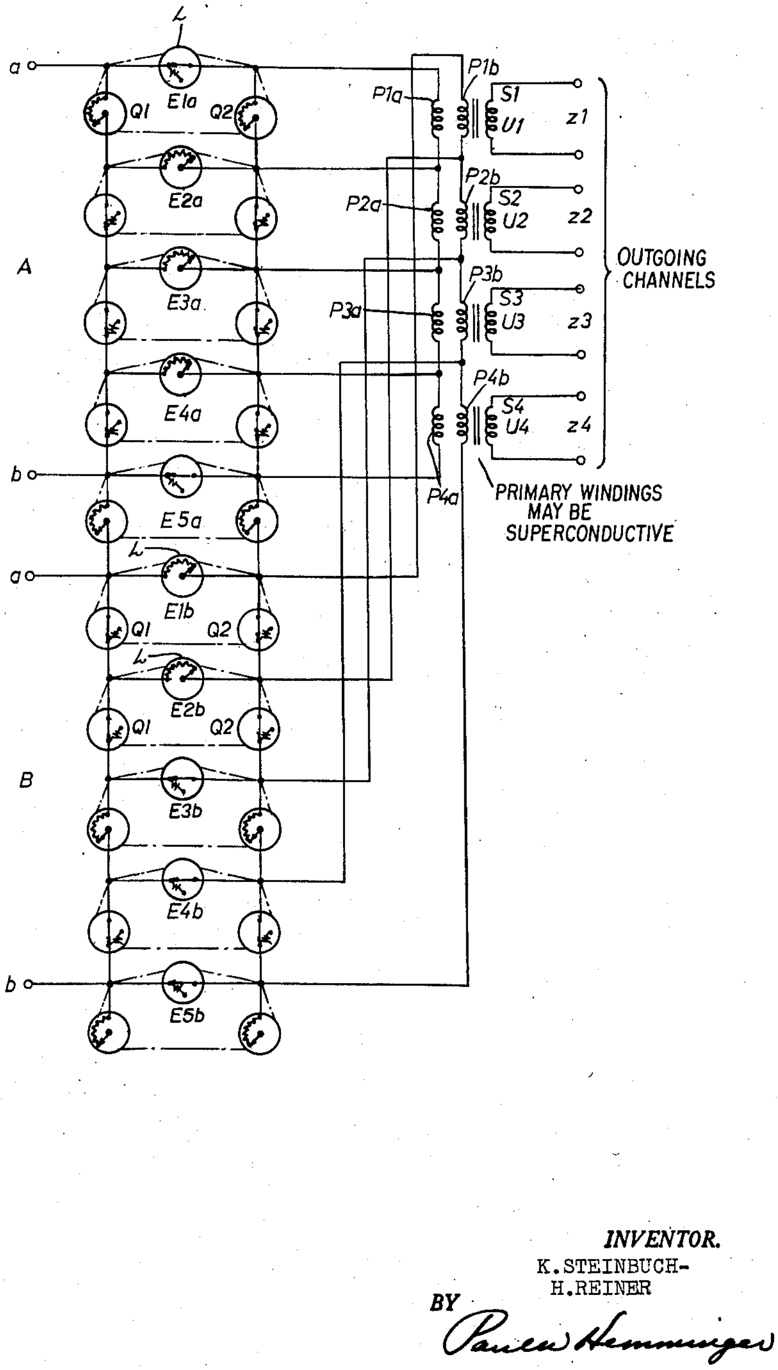
FIG. 8 shows a simplified network of a link-access switching system utilizing the device of FIG. 6.

FIG. 8 shows a link-access switching system employing the trigger device according to FIGS. 6 and 7. In this case it is possible to perform a twin-wire connection of the speaking wires. The trigger devices, designed as $\pi$-elements, are connected in such a way that the outputs of the shunt branches which are not connected in the longitudinal branch, are connected to the outputs of the longitudinal branch of the following trigger device. In this way there is obtained a chain, to the first and the last member of which the two wires of the subscriber's line are connected, i.e. to the outputs of the longitudinal branches. On the other side of this chain, between respectively two successive outputs, there lies the primary winding of a transformer. These transformers are provided with one primary winding for each subscriber, while their secondary winding leads to the next successive trigger stage. The number of these transformers is equal to the number of the outgoing channels.

The outputs and shunt branches of the last trigger device of such a chain, which are not in connection with the longitudinal branch, are unconnected.

Assume now that these two subscribers form part of a group of subscribers served by four outgoing channels Z1 . . . Z4, which are accessible via the transformers U1 . . . U4. In FIG. 8 those particular trigger stages which have to be regarded as being conductive due to the trigger condition just assumed by the respective trigger device, are indicated by the hatched portions. If a call is made by the subscriber A, then the speaking wires *a*, *b* thereof are connected via the switching devices E1*a* to E5*a* to the outgoing channel Z1, for example. This is accomplished by common control apparatus (not shown) triggering the trigger device E1*a* into the position in which its longitudinal branch L becomes conductive. The corresponding shunt branches Q1 and Q2 of E1*a* are then blocked. The L branch of the trigger devices E2*a*, E3*a* and E4*a* are in the nontriggered condition, while the L branch of the trigger device E5*a* is brought into the same condition as the L branch E1*a*. Accordingly, the speech circuit of the subscriber A extends in the following way: From the subscriber set (not shown), wire *a*, longitudinal branch L of the trigger device E1*a*, primary winding P1*a* of the transformer U1, shunt branches Q2 of the trigger devices E2*a*, E3*a*, E4*a*, longitudinal branch L of the trigger device E5*a*, and wire *b*, to the subscriber set. At the same time, as above noted, busy test apparatus excludes the remaining subscribers from having access to the transformer U1.

Assume now that the outgoing channel Z2 has been seized by another subscriber in the meantime. If a call is now made by the subscriber B then the transmission channel Z3 will be put at his disposal. The trigger devices E1*b*, E2*b* and E4*b* are triggered into that particular trigger condition in which their longitudinal branch L is interrupted, while the devices E3*b* and E5*b* assume the opposite condition. In this case the speech circuit will then extend over wire *a*, shunt members Q1 of the trigger devices E1*b* and E2*b*, longitudinal branch L of the trigger device E3*b*, winding P3*b* of the transformer U3, shunt branch Q2 of the trigger device E4*b*, longitudinal branch L of the trigger device E4*b*, and wire *b*.

The switching ratio of these types of trigger devices is actually better than that of normal types of relay make contacts, because in the case of superconductivity the resistance actually becomes zero. Accordingly, the superconductive trigger stages always constitute an absolute short circuit. In these arrangements the signal currents may assume a value of several amperes, provided, of course, that the remaining parts are correspondingly suited to the system, in particular that the operating resistance of the normal telephone lines of 600 ohms is transformed in a suitable way to a value of $10^{-4}$ ohms. Accordingly, the transformers must have no or only very low losses. Preferably, therefore, the windings of these transformers are likewise made of a superconductive material.

On account of the high currents the danger of causing crosstalks is particularly great due to the inductive coupling. Of course, this danger is somewhat reduced by the shunt circuits, but still there has to be provided a magnetic shielding. Foils of a superconductive material are specially suitable for effecting such a shielding.

However, the bistable trigger device according to the invention is not only suitable for space switching systems, but can also be used for time-spaced switching systems due to the extremely high switching speed hitherto not achievable by any other kinds of switching means.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A cryogenic bistable device comprising a first and a second superconducting coil each surrounding a plurality of superconducting cores and a third coil surrounding the said superconducting coils, means for connecting one end of each of said superconducting coils to one end of one of said cores associated therewith and to a control conductor, means for connecting the free end of each of said superconducting coils to the free end of the last-said core associated with the other superconducting coil, means for interconnecting the ends of the unconnected superconducting cores to provide a multi-element switching circuit, and means including the said control conductors and the said third coil for selectively energizing the said coils to generate magnetic fields to change the state of said device from one stable state to its alternate stable state successively to thereby control the conductivity of the individual elements of the said multi-element switching circuit.

2. A cryogenic bistable device as set forth in claim 1, wherein the said superconducting coils comprise a material which loses its superconductivity in a magnetic field of a first intensity and wherein the said superconducting cores comprise a material which loses its superconductivity in a magnetic field of a second intensity which is less than the said first intensity.

3. A cryogenic bistable device as set forth in claim 1, wherein the said multi-element switching circuit comprises three elements arranged in a T-type circuit configuration and wherein the two elements in the horizontal branch and the one element in the vertical branch of the T-type circuit lose their superconductivity alternately in response to the said selective energization of the said coils.

4. A cryogenic bistable device as set forth in claim 1, wherein the said multi-element switching circuit comprises three elements arranged in a $\pi$-type circuit configuration and wherein the one element in the horizontal branch and the two elements in the vertical branch of the $\pi$-type circuit lose their superconductivity alternately in response to the said selective energization of the said coils.

5. A plurality of cryogenic bistable devices each comprising a plurality of control conductors and multi-element controlled conductors electrically separate from said control conductors, and means for connecting said devices in a switching network having an input conductor and a plurality of output conductors wherein one of said controlled elements of each of a group of said devices are connected in multiple to said input conductor and wherein another one of said controlled elements of each of the last-said devices are connected to respective ones of said individual output conductors, whereby the said input conductor may be selectively connected in circuit with any output conductor to the exclusion of the other said output conductors.

References Cited in the file of this patent

UNITED STATES PATENTS

| | | |
|---|---|---|
| 2,367,681 | Karplus | Jan. 23, 1945 |
| 2,471,155 | Langmuir | May 24, 1949 |
| 2,569,309 | Hepp | Sept. 25, 1951 |

OTHER REFERENCES

"Transistors as a New Class of Relays" by Brown and Beter, Control Engineering, December 1956, pages 70–76.